P. Philippi.

Nut Locking Device.

N° 88,668.                    Patented Apr. 6, 1869.

Witnesses:
Mrs. A. J. Morgan
E. J. Collins

Inventor:
P. Philippi
Per
Munn & Co.
Attorneys

United States Patent Office.

P. PHILIPPI, OF BEARDSTOWN, ILLINOIS.

Letters Patent No. 88,668, dated April 6, 1869.

IMPROVEMENT IN NUT-LOCKING DEVICE.

The Schedule referred to in these Letters Patent and making part of the same.

*To all whom it may concern:*

Be it known that I, P. PHILIPPI, of Beardstown, in the county of Cass, and State of Illinois, have invented a new and useful Improved Nut-Locking Device; and I do hereby declare that the following is a full, clear, and exact description thereof, which will enable others skilled in the art to make and use the same, reference being had to the accompanying drawing, forming part of this specification.

This invention relates to improvements in nut-locking devices, for preventing the nuts from becoming loose upon fastening-bolts, and designed more particularly for locking the nuts of bolts used for fastening fish-plates.

It consists of a bar, having mortises through it, or notches in the ends or sides, to fit the nuts, to be placed on the surface of the fish-plate against which the nuts are screwed, so as to engage the nuts in the said notches, or mortises, and, being held in said position by a bolt or bolts projecting from the said surface, and held by spring-keys, thereby locking the said nuts, and preventing their disengagement.

Similar letters of reference indicate like parts.

A represents the locking-plate, which may have mortises *a* through it, of the form of the nuts *b*, to be secured; or, instead of the mortises, notches may be formed in the end of the plate, to fit a corner of the nut, or of sufficient size to envelop half the nut.

Figure 1:
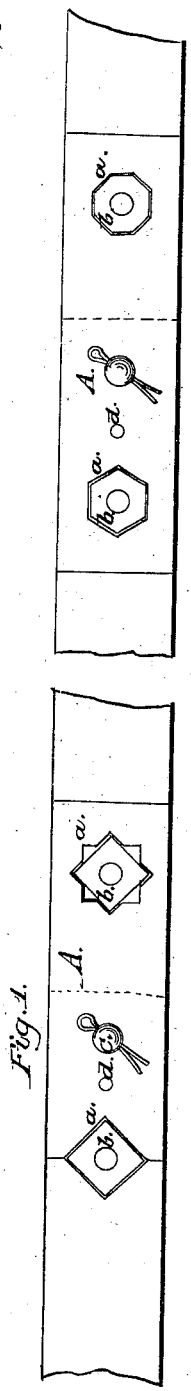
Figure 1 represents a plan view of my improved device.
Figure 2:
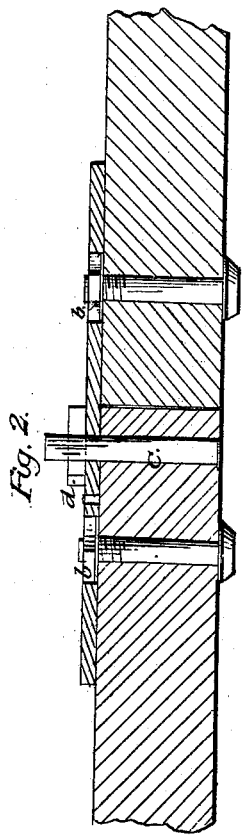
Figure 2 represents a longitudinal sectional elevation of the same.

The said plate is placed upon the fish-plate, or other thing to the bolts of which the nuts are to be locked, so as to enter the said nuts in the mortises or notches, as represented in fig. 1, and may be held in that position by a bolt C, having a spring-pin, or key to hold it.

In case there is but one nut to be held, and the plate A has only a notch in the end, dowel-pins, *d*, may be fixed in the fish-plate, or other article, to take into holes in the plate A, to prevent it from turning on the bolt C, so as to disengage the nut.

I am aware that bars have been used, having notches in their sides adapted to fit against shoulders formed upon the under side of the nuts; but this I do not claim.

What I do claim, and desire to secure by Letters Patent, is—

The notched plate A, when secured to the fish-plate by means of the bolt C, the spring-key, and the dowel-pins *d*, as herein described, for the purpose specified.

P. PHILIPPI.

Witnesses:
I. PHILIPPI,
ED. H. PHILIPPI.